United States Patent

[11] 3,619,449

| | | |
|---|---|---|
| [72] | Inventor | Daniel Berard<br>Boulogne-sur-Seine, France |
| [21] | Appl. No. | 685,087 |
| [22] | Filed | Nov. 22, 1967 |
| [45] | Patented | Nov. 9, 1971 |
| [73] | Assignee | Les Industries Musicales et Electriques<br>Pathe Marconi<br>Paris, France |
| [32] | Priority | Nov. 29, 1966 |
| [33] | | France |
| [31] | | 85366 |

[54] METHODS OF MANUFACTURING GRAMOPHONE RECORDS
7 Claims, 4 Drawing Figs.

[52] U.S. Cl. .................................................. 264/106,
264/327
[51] Int. Cl. ............................................... B29d 17/00
[50] Field of Search........................................ 249/79;
264/106, 107, 327; 18/5.3 F, 5.3 H, 5.3 M, 5.3 P,
38

[56] References Cited
UNITED STATES PATENTS

| | | | |
|---|---|---|---|
| 2,501,823 | 3/1950 | Leedom ...................... | 18/5.3 |
| 2,781,547 | 2/1957 | Moxness...................... | 264/327 |
| 3,390,217 | 6/1968 | Phillipson et al. ............ | 264/107 |
| 2,642,621 | 6/1953 | Amo............................ | 18/17 X |
| 2,961,699 | 11/1960 | Dijksterhuis et al. ......... | 18/38 X |
| 3,294,883 | 12/1966 | Polka ......................... | 264/327 X |

FOREIGN PATENTS

| | | | |
|---|---|---|---|
| 566,544 | 1958 | Belgium ...................... | 264/327 |
| 1,071,340 | 6/1967 | Great Britain................ | 264/107 |

*Primary Examiner*—Donald J. Arnold
*Assistant Examiner*—Richard R. Kucia
*Attorney*—William W. Downing, Jr.

ABSTRACT: In injection molding gramophone records, the material is injected into a cavity in which the region forming the transcription band is heated with a region around the periphery being cooled.

PATENTED NOV 9 1971      3,619,449

METHODS OF MANUFACTURING GRAMOPHONE RECORDS

The present invention relates to methods for the manufacture of gramophone records by injection molding It has been proposed that gramophone records may be manufactured by injecting a moldable plastics material under pressure into a heated molding chamber. One moldable plastics material suitable for this purpose is polyvinyl acetochloride. When the injection molding operation is completed, the mold is cooled by circulating a cooling fluid around it so that the molded record may be removed from the mold without damaging the groove structure of the transcription band on the record. It should be noted that that part of the gramophone record and corresponding part of the mold which contains the groove modulated with program material will be referred to herein as the transcription band.

In practice the moldable material is normally heated to a temperature in the region of 120° C. to 170° C., and is then injected into the mold chamber which has itself been heated to a temperature in the region of 60° C. to 180° C. When the molding process has been completed, the molding chamber is cooled by the circulation of a fluid at a temperature in the region of from 10° C. to 30° C. through passages within molding plates which make up the walls of the molding chamber. For this, the mold plates are provided either with spiral cavities or with a series of concentric cavities equipped with communicating apertures and, if necessary, baffles, to ensure that circulating fluids traverse all the turns.

There are, however, certain disadvantages present in the proposed arrangement. Firstly, after the injection operation has been completed, the central part of the mold is occupied by a core of plastic material which is disposed axially and whose cooling is therefore slow. Since the ejection of the molded disc from the mold is often carried out by an axial thrust from a suitably arranged tappet, ejection can only take place once the core has cooled sufficiently. This requirement greatly lengthens the molding cycle.

Secondly, even though the mold chamber, which is made in two separable halves to facilitate removal of the record, is forcibly clamped together during the injection molding process, the plastic material nevertheless tends to flow between the peripheral edges of the matrices giving rise to a molding flash which must be subsequently removed by appropriate finishing apparatus.

It is an object of the present invention to provide an improved method for manufacturing gramophone records by injection molding which will substantially reduce the molding time, or the need for subsequent trimming, or both without the necessity for any major changes in the material used.

According to one aspect of the present invention there is provided a method of molding gramophone records by injection molding in a mold cavity, formed between mold parts, including the step of injecting heated moldable material into the mold cavity while a first region in said mold cavity including that forming the transcription band is being heated and while a second region in said mold cavity around the periphery thereof is being cooled.

According to another aspect of the present invention there is provided a method of molding gramophone records by injection molding in a mold cavity, formed between mold parts, including the step of injecting heated moldable material into the mold cavity while a first region in said mold cavity including that forming the transcription band is being heated and while a second region in said mold cavity adjacent the center thereof is being cooled.

According to a further aspect of the present invention there is provided a method of molding gramophone records by injection molding in a mold cavity, formed between mold parts, including the step of injecting a heated moldable material into the mold cavity while a first region in said mold cavity including that forming the transcription band is being heated and while two further regions, one around the periphery of the mold cavity and one adjacent the center of the mold cavity, are being cooled.

Thus there is ensured an accelerated cooling of the injection core or a removal of the tendency for material to flow out at the periphery of the matrix or both effects together.

The present invention may be combined with the subject matter of copending U.S. Pat. application Ser. No. 681,699 filed on 9th Nov. 1967 which provides for the creation of a partial vacuum in the molding chamber. Other features of molding invention will become apparent from the following description.

In order that the present invention may be clearly understood and readily carried into effect certain embodiments thereof will now be described by way of example with reference to the accompanying drawings, of which:

Figure 1:
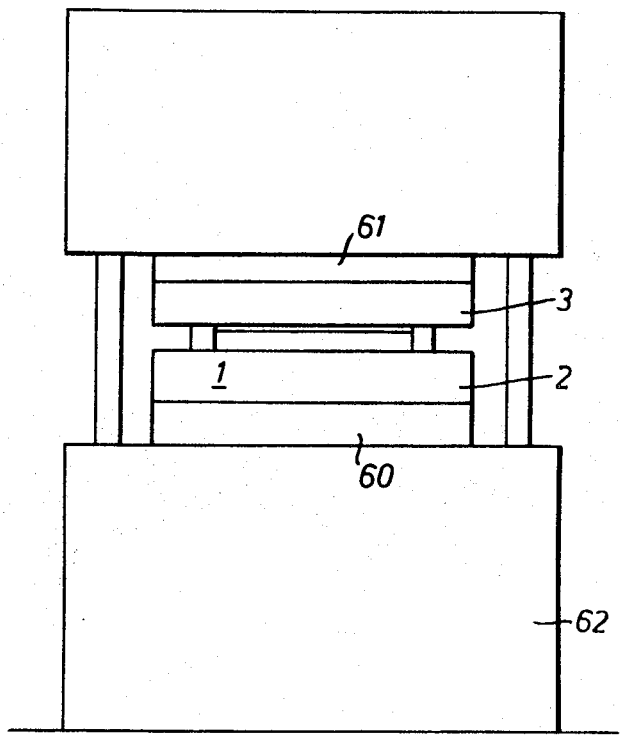
FIG. 1 is the front elevation of a gramophone record injection molding press.

The method in accordance with the invention will now be described concurrently with apparatus for carrying out the method. FIG. 1 illustrates in frontal elevation a gramophone record injection molding press in which the lower and upper mold base plates 2, 3 of a mold assembly 1 are attached respectively to the faces of bolsters 60 and 61. The lower bolster 60 may conveniently be fixed in relation to the body of the press 62, since the injection channel for moldable material is passed therethrough to the mold base plate 2.

The upper bolster 61 is caused to rise and fall so that the mold 1 may respectively be opened for the removal of a molded record or closed so that a record may be molded. The upper bolster may be driven by any convenient means, such for example as a hydraulic ram.

Figure 2:
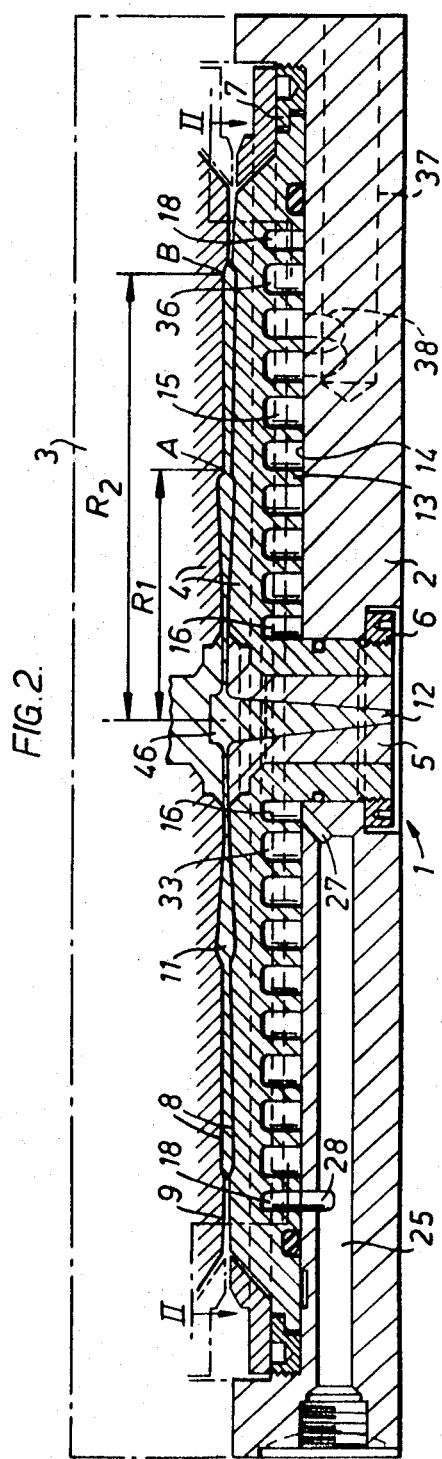
FIG. 2 is a vertical section of part of a mold constructed in accordance with the present invention, and shown in the closed position.

Reference will now be made to the vertical section of FIG. 2 through the axis of the mold block 1 along the directions I—I shown on FIG. 3 and to the horizontal section of FIG. 3 through the mold block 1 in the direction II—II shown on FIG. 2. The mold 1 has two base plates 2, 3, to the outer face of each of which is attached a mold plate 4. The base plate 2 carries an injection nozzle 5 for injecting moldable plastics material into the molding apparatus. The base plate 3 carries an ejection tappet, not shown in the drawing, for ejecting the molded record from the mold. A mold plate 4 is attached to the face of each of the base plates 2, 3 by means of a threaded ring 6 and the screws 7, which are shown only in respect of the base plate 2 as the arrangement for the base plate 3 is similar. Apart from the presence of the injection nozzle 5, the upper and lower halves of the mold assembly 1 are similar in construction and, therefore, only the lower half is shown in detail in the vertical section of FIG. 1. The two matrices 8, which consist normally of foils of metal having the required groove pattern of the transcription band containing the recorded program material, formed in inverse sense on the outer surface thereof, are attached to the corresponding outer surfaces of the mold plates 4 and are arranged to be in mutual contact along their peripheral edges 9, when the mold assembly 1 is closed. A molding chamber 11 is formed between the matrices 8 into which moldable plastics material is injected via a channel 12 of the nozzle 5. The groove pattern is formed on the matrices 4 within the zone A-B lying between an inner radius $R_1$ and an outer radius $R_2$.

Each mold plate 4 has a series of concentric ribs 13 which extend to rest on the outer surface of the corresponding base plate 2, 3. Concentric grooves 15 are thus formed inside the plate 4 through which heating or cooling fluids may be circulated as required.

Figure 3:
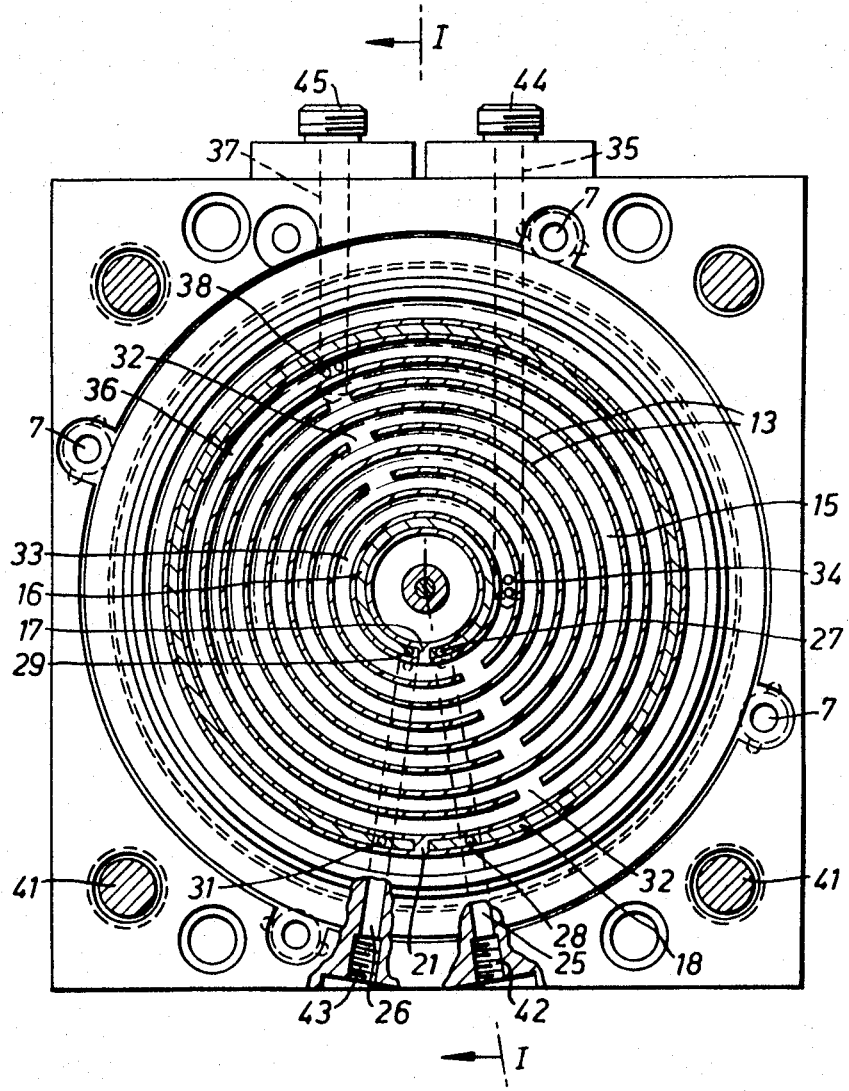
FIG. 3 is a horizontal section along II—II of the mold of FIG. 2.

The inner groove 16, located in the vicinity of the injection nozzle 5, is closed by a radial partition 17 shown in FIG. 3. The outer groove 18, located in the vicinity of the peripheral edges 9 of the matrices 8, is closed by a radial partition 21. Ducts 25 and 26 are drilled out to either side of the partitions 17 and 21, within the thickness of the base plate 2. The ducts 25, 26 are caused to communicate with the grooves 16 and 18, the first through apertures 27 and 28, and the second via apertures 29 and 31 respectively.

The intermediate grooves, situated between the grooves 16 and 18, communicate one with another via windows 32, formed in the respective ribs 13, and located along a diameter alternately to one side and the other of the central axis of the mold. The intermost groove of this circuit is caused to communicate by a pair of orifices 34, with a duct 35 made in the thickness of the base plate 2. Similarly the outer groove 36 communicates with a pipe 37 by a pair of orifices 38.

The radius of the rib 13 which forms the inner boundary of the groove 18, is selected in such a way that it is larger than the radius $R_2$ marking the outer limit of the part of a disc which contains a recorded groove and which is referred to herein as the transcription band. Conversely, the radius of the rib 13 forming the outer boundary of the groove 16, is smaller than the radius $R_1$ marking the inner limit of the transcription band.

The operation of the molding apparatus described above is as follows.

After the matrices 8 have been placed in position on the front faces of the mold plates 4, the two base plates 2 and 3 of the mold 1 are brought together and clamped one against the other by means of the bolsters 60, 61 of the press 62. The location of the two mold halves with respect to each other, is ensured by means of guide studs 41, attached to one of the base plates, which slide in corresponding recesses in the other base plate.

The ducts 25 and 26 are connected via flexible tubes connected to the terminal joints 42 and 43, to the respective flow and return circuit for cooling fluid. In a similar way, the ducts 35 and 37 are connected by means of joints 44 and 45, to a respective flow and return pipe and a valve system, not shown, which allows either heating or cooling fluid to circulate as required.

The circulation of the cooling fluid in the grooves 16 and 18 is permanently established throughout the whole period of the molding cycle via the ducts 25 and 26.

At the commencement of the molding cycle, a circulation of heating fluid is established in the grooves 15 via the ducts 35 and 37. When the mold assembly 1, including the base plates 2, 3, has reached an appropriate temperature, moldable plastics material is injected via the orifice 12 of the nozzle 5. When the molding chamber 11 is completely full, the injection process is halted, and the circulation of heating fluid in the intermediate grooves 15, is replaced by the circulation of cooling fluid via the same ducts 35 and 37, in order to cool the mold. When the mold has been cooled sufficiently, it is opened by drawing apart the bolsters 60 and 61 to which the base plates 2 and 3 are attached, and the molded disc is ejected by any convenient means, not shown.

By way of guidance as to the conditions required in a practical realization of the invention, the thermoplastic material may be injected at a temperature in the region of 120° C. to 170° C., into a mold whose temperature varies between 60° C. and 180° C., the temperature of the cooling fluid being in the region from 10° C. to 30° C.

The permanent circulation of cooling fluid through the ducts 25 and 26, and the grooves 16 and 18, has the effect of creating two zones of relatively low temperature, one adjacent the center of the mold in the vicinity of the injection nozzle 5, and the other at the periphery of the matrices 8, while the intermediate region of the mold, including the base plates 2, 3 is raised to the high temperature needed for the correct molding of the record grooves.

In this way, the core of plastic material 46 which exists in the nozzle 5, is cooled more rapidly, and, in addition, the plastic material has substantially no tendency to flow between the cooled peripheral edges 9 of the matrices 8.

The method thus has the advantage of allowing the record to be removed from the mold more rapidly, and this substantially shortens the time required for the molding cycle. The method also avoids the formation of flash on the periphery of the molded discs, which would necessitate special finishing work.

In addition, the invention may readily be carried into effect by making only simple changes in the construction of the mold shells, since all that is required is the addition of new ducts 25, 26 and the closure of certain of the windows 32 in a conventional mold plate.

Figure 4:
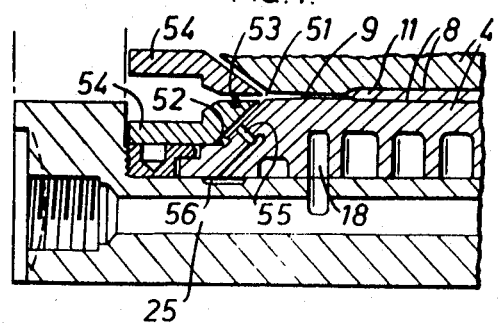
FIG. 4 is an enlarged detail in vertical section of the periphery of the matrices in a modified form of FIG. 2.

The vertical sectional detail shown in FIG. 4 illustrates the manner in which the present invention may be applied to gramophone record molding apparatus constructed in accordance with copending U.S. Pat. application Ser. No. 681,699 filed on 9th Nov. 1967 for "Improvements in or relating to methods and apparatus for the manufacture of gramophone records."

The aforementioned application shows how a vacuum in relation to the ambient atmosphere may be creased in the molding chamber. In order that this may be achieved in the present invention, an annular enclosure 51 is provided around the outer region of the plates 4, which is sealed against the ambient atmosphere by means of sealed joints, such as 52, 53, carried by or in contact with an annular guard ring 54 fixed to the periphery of each plate 4. A source of vacuum, not shown, is connected to the enclosure 51 via ducts 55, 56 formed in the peripheral edge of the mold plate 4 and the base plate 2. The molding chamber 11 is caused to communicate with the enclosure 51 by means of shallow grooves in the form of castellations, formed in the peripheral edges 9 of the matrices 8, so that the vacuum applied around the periphery of the molding chamber 11 before and during the injection molding process, is enabled thereby to draw air out of the molding chamber 11. This improves the quality of the molded record by substantially preventing the formation of bubbles in the surface thereof, but at the same time slightly increases the tendency for flash to form at the periphery due to the air escape channels of the castellated edges 9. This latter disadvantage is however greatly reduced, in accordance with the present invention, by the circulation of cooling fluid in the groove 18. The remaining mold structure is similar to that shown in FIGS. 2 and 3.

Whereas the invention has been described with reference to a specific embodiment in which both an outer and an inner one of the mold is cooled during the injection molding process, it is not intended that the monopoly should be limited only to the cooling of both zones. The respective advantages will nevertheless be obtained if only one of the zones is cooled in dependence on the molding requirements. Thus if a record is to be pressed having a relatively thin central portion or the duration of the molding time is not important, the outer zone alone may nevertheless be cooled with advantage, to prevent the formation of flash. Alternatively, if only the inner zone is cooled, the advantage of shorter molding time would still be realized when the center portion is relatively thick.

It should further be understood that the scope of the invention is not to be confined to the specific embodiments hereinbefore described, and practical variants may be constructed which are also included within the monopoly claimed. For example, insulating material may be introduced into the ribs separating the grooves 16 or 18 from the grooves 15, to prevent an excessive exchange of heat between the hot fluid circulating in the grooves 15 and the cold fluid in grooves 16 and 18 during the initial portion of the molding cycle. In addition, the inner and outer circuits 16, 18, may each comprise a plurality of concentric grooves, and these circuits may also be supplied via a plurality of ducts to increase the fluid delivery rates.

What I claim is:

1. A method of molding gramophone records having a transcription band by injection molding in a mold cavity, formed between mold parts, including the step of injecting heated moldable material into the mold cavity while a first region in said mold cavity including that forming the said transcription band is being heated and while a second region in said mold cavity around the periphery thereof is being cooled.

2. A method of molding gramophone records having a transcription band by injection molding in a mold cavity formed between mold parts, including the step of injecting heated moldable material into the mold cavity while a first region in said mold cavity including that forming the said transcription band is being heated and while a second region in said mold cavity adjacent the center thereof is being cooled.

3. A method of molding gramophone records having a transcription band by injection molding in a mold cavity, formed between mold parts, including the step of injecting a heated moldable material into the mold cavity while a first region in said mold cavity including that forming the said transcription band is being heated and while two further regions, one around the periphery of the mold cavity and one adjacent the center of the mold cavity, are being cooled.

4. A method according to claim 1 in which said second region in the mold cavity comprises an annular zone in the vicinity of the region in which the edges of two mold parts are pressed together.

5. A method according to claim 2 in which said mold is provided with a central aperture through which moldable material may be injected into said mold cavity and said second region in the mold cavity comprises an annular zone surrounding the injection aperture.

6. A method according to claim 1 including the steps of cooling said first region in said mold cavity after the step of injecting heated moldable material into the mold cavity and while continuing to cool said second region in said mold cavity, and thereafter separating the molded record from said cavity.

7. A method according to claim 2 including the steps of cooling said first region in said mold cavity after the step of injecting heated moldable material into the mold cavity and while continuing to cool said second region in said mold cavity, and thereafter separating the molded record from said cavity.

* * * * *